United States Patent
Drummey et al.

(10) Patent No.: US 11,795,357 B2
(45) Date of Patent: Oct. 24, 2023

(54) POLY(ETHERIMIDE-PHTHALONITRILE) ADHESIVES AND RELATED METHODS

(71) Applicant: The Boeing Company, Chicago, IL (US)

(72) Inventors: Kevin James Drummey, Malibu, CA (US); Ashley Marie Dustin, Santa Monica, CA (US); Andrew P. Nowak, Los Angeles, CA (US); Michael Jared Ventuleth, Camarillo, CA (US); Gregory Phillip Nowak, Swansea, IL (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 17/411,191

(22) Filed: Aug. 25, 2021

(65) Prior Publication Data

US 2023/0103527 A1 Apr. 6, 2023

(51) Int. Cl.

| | |
|---|---|
| C08G 73/10 | (2006.01) |
| C09J 11/06 | (2006.01) |
| C09J 5/06 | (2006.01) |
| C09J 179/08 | (2006.01) |
| C08K 3/013 | (2018.01) |
| C08K 5/00 | (2006.01) |
| C08K 5/315 | (2006.01) |
| C09J 7/35 | (2018.01) |
| C08G 73/12 | (2006.01) |

(52) U.S. Cl.
CPC .......... *C09J 179/08* (2013.01); *C08G 73/127* (2013.01); *C08K 3/013* (2018.01); *C08K 5/0025* (2013.01); *C08K 5/315* (2013.01); *C09J 5/06* (2013.01); *C09J 7/35* (2018.01); *C08G 2170/20* (2013.01)

(58) Field of Classification Search
CPC .... C08G 73/024; C08G 73/1046; C09J 11/06; C09J 179/02; C09J 179/08; C09J 5/06; C08K 5/315; C08K 3/013; C08K 5/0025
See application file for complete search history.

(56) References Cited

U.S. PATENT DOCUMENTS

| | | | |
|---|---|---|---|
| 3,890,274 A | | 6/1975 | D'Alelio |
| 3,996,196 A | | 12/1976 | D'Alelio |
| 4,973,630 A | * | 11/1990 | Leung ............ C08L 79/08 525/931 |
| 5,061,780 A | * | 10/1991 | Wang ............ C08G 73/1085 528/323 |
| 5,132,396 A | | 7/1992 | Keller |
| 5,159,054 A | | 10/1992 | Keller |
| 5,242,755 A | | 9/1993 | Keller et al. |
| 5,262,514 A | | 11/1993 | Keller |
| 8,222,403 B2 | | 7/2012 | Laskoski et al. |
| 8,921,510 B1 | | 12/2014 | Keller et al. |
| 2006/0194944 A1 | | 8/2006 | Fowler et al. |
| 2017/0002146 A1 | | 1/2017 | Keller et al. |
| 2021/0340413 A1 | * | 11/2021 | Dustin ............ C09J 179/02 |

FOREIGN PATENT DOCUMENTS

| | | |
|---|---|---|
| WO | WO 2014/021946 A | 2/2014 |
| WO | WO 2016/100259 A | 6/2016 |
| WO | WO 2018/175025 A | 9/2018 |

OTHER PUBLICATIONS

Sheng et al., "Synthesis of high performance bisphthalonitrile resins cured with self-catalyzed 4-aminophenoxy phthalonitrile," Thermochimica Acta 577 (2014) 17-24.
Patel et al., "Mechanism of thermal decomposition of poly(ether ether ketone) (PEEK) from a review of decomposition studies," Polymer Degradation and Stability 95, pp. 709-718, May 2010.
Extended European Search Report for EP 22180083.2 dated Nov. 30, 2022; pp. 1-10.

* cited by examiner

*Primary Examiner* — Caixia Lu
(74) *Attorney, Agent, or Firm* — Bell & Manning, LLC

(57) ABSTRACT

Phthalonitrile adhesive formulations are provided. Such an adhesive formulation may comprise an etherimide-phthalonitrile oligomer having formula

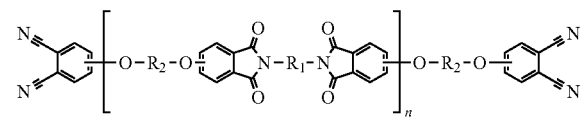

wherein $R_1$ is an unsubstituted or substituted aryl group or an unsubstituted or substituted cycloalkyl group; $R_2$ is an unsubstituted or substituted aryl group and n has a value of from 1 to 30. Also provided are methods of making and using the adhesive formulations.

26 Claims, 1 Drawing Sheet

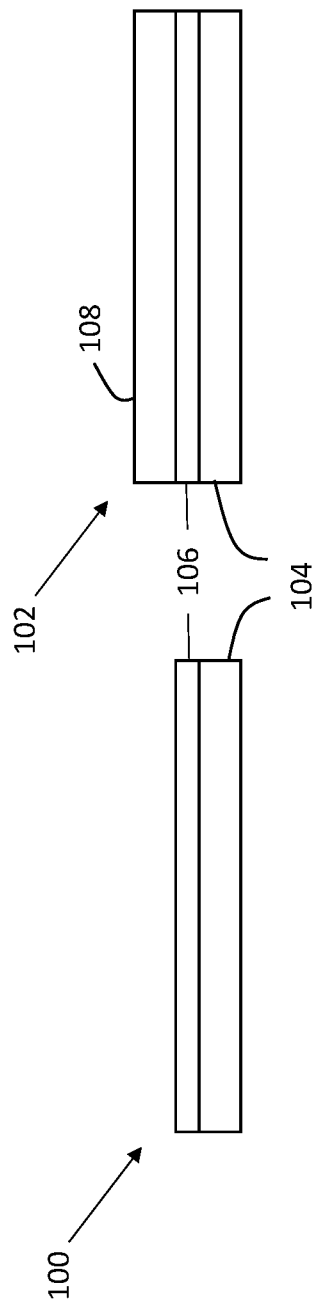

POLY(ETHERIMIDE-PHTHALONITRILE) ADHESIVES AND RELATED METHODS

BACKGROUND

High temperature adhesives are of interest in a range of applications, including in the transportation (e.g., aerospace) industry. Currently, there are limited high temperature adhesives available. Some polyimide and phthalonitrile adhesives have been developed for such applications. Unfortunately, current aerospace systems requiring high temperature adhesives design around the temperature limitations of available materials. This impacts cost, weight, and system level performance. Next generation aircraft may see unavoidable higher service temperatures, which places a greater premium on improving the properties of these high temperature adhesives.

SUMMARY

Provided herein are phthalonitrile adhesive formulations and methods of making and using the adhesive formulations. The adhesive formulations comprise a unique etherimide-phthalonitrile oligomer formed from a unique bisimide monomer. Synthesis of the bisimide monomer avoids the use of certain dianhydrides that have limited availability but are required for synthesizing existing phthalonitrile oligomers. In addition to the increased synthetic flexibility afforded by the present adhesive formulations, embodiments of the etherimide-phthalonitrile oligomers are soluble in a wide-range of solvents enabling facile processing, including the formation of sprays, pastes, and composite films thereof. Furthermore, embodiments of the present adhesive formulations provide thermoset polymers which exhibit high levels of thermooxidative stability and adhesive strength, rendering them excellent for use under high temperature conditions.

In an embodiment 1, an adhesive formulation comprises an etherimide-phthalonitrile oligomer having formula

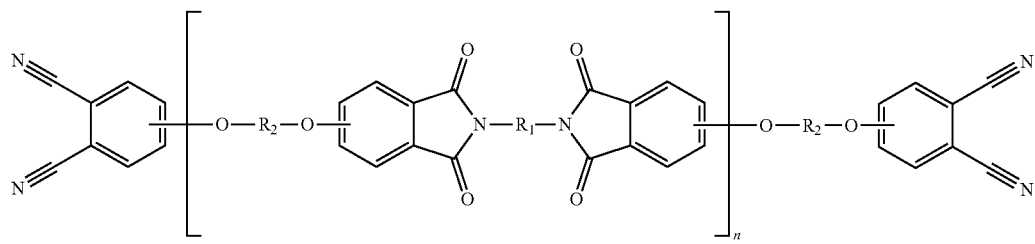

wherein $R_1$ is an unsubstituted or substituted aryl group or an unsubstituted or substituted cycloalkyl group; $R_2$ is an unsubstituted or substituted aryl group and n has a value of from 1 to 30.

An embodiment 2 is the adhesive formulation of embodiment 1, wherein $R_1$ is monocyclic, or polycyclic having two or more unfused monocyclic rings.

An embodiment 3 is the adhesive formulation of embodiment 1, wherein $R_1$ is unsubstituted or substituted benzene, or unsubstituted or substituted cyclohexane.

An embodiment 4 is the adhesive formulation of embodiment 1, wherein $R_1$ is polycyclic having two or more unfused monocyclic rings, wherein neighboring unfused monocyclic rings are connected directly or connected via an oxygen, a sulfone, or an unsubstituted or substituted alkyl group.

An embodiment 5 is the adhesive formulation of any of embodiments 1-4, wherein $R_2$ is monocyclic, or polycyclic having two or more unfused monocyclic rings.

An embodiment 6 is the adhesive formulation of any of embodiments 1-4, wherein $R_2$ is unsubstituted benzene.

An embodiment 7 is the adhesive formulation of any of embodiments 1-4, wherein $R_2$ is polycyclic having two or more unfused monocyclic rings, wherein neighboring unfused monocyclic rings are connected directly or connected via one or more groups selected from a group consisting of a ketone group, an ether group, a urethane group, a urea group, an amide group, an imide group, an ester group, an oxamide group, a sulfone group, an alkyl group, and an alkylene group, wherein any group may be unsubstituted or substituted.

An embodiment 8 is the adhesive formulation of any of embodiments 1-4, wherein $R_2$ is polycyclic having two unfused monocyclic rings connected directly or connected via a sulfone group, an unsubstituted or substituted alkyl group, or an unsubstituted or substituted alkylene group.

An embodiment 9 is the adhesive formulation of embodiment 1, wherein $R_1$ is unsubstituted or substituted benzene; or unsubstituted or substituted cyclohexane; or polycyclic having two or more unfused monocyclic rings, wherein neighboring unfused monocyclic rings are connected directly or connected via an oxygen, a sulfone, or an unsubstituted or substituted alkyl group; and wherein $R_2$ is unsubstituted benzene; or polycyclic having two unfused monocyclic rings connected directly or connected via a sulfone group, an unsubstituted or substituted alkyl group, or an unsubstituted or substituted alkylene group.

An embodiment 10 is the adhesive formulation of embodiment 1, wherein the etherimide-phthalonitrile oligomer is

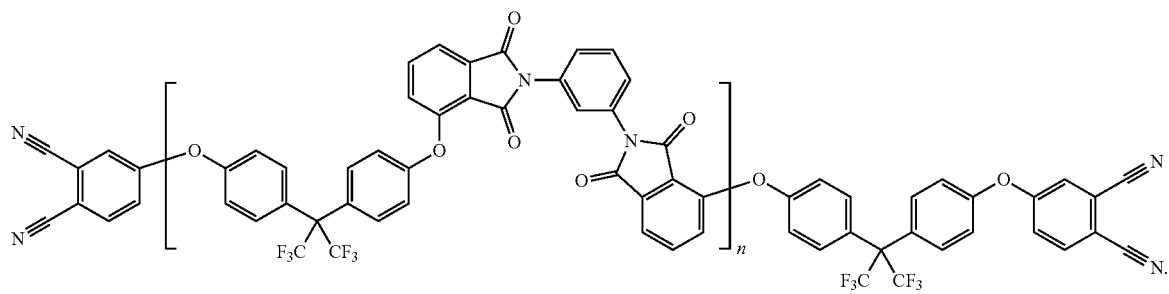

An embodiment 11 is the adhesive formulation of any of embodiments 1-10, further comprising a bisphthalonitrile compound.

An embodiment 12 is the adhesive formulation of embodiment 11, wherein the bisphthalonitrile compound comprises an aromatic ether linking group and an aromatic ketone linking group.

An embodiment 13 is the adhesive formulation of embodiment 12, wherein the aromatic ether linking group is provided by a bisphenol and the aromatic ketone linking group is provided by a benzophenone.

An embodiment 14 is the adhesive formulation of any of embodiments 1-13, wherein a portion of phthalonitrile moieties in the etherimide-phthalonitrile oligomer are crosslinked, forming a prepolymer.

An embodiment 15 is the adhesive formulation of embodiment 14, further comprising a liquid medium.

An embodiment 16 is the adhesive formulation of embodiment 15, further comprising a filler.

An embodiment 17 is the adhesive formulation of any of embodiments 15-16, having a shear viscosity of greater than 1,000 cps as measured at room temperature and 100 Hz.

An embodiment 18 is the adhesive formulation of any of embodiments 15-16, having a shear viscosity of less than 300 cps as measured at room temperature and 100 Hz.

An embodiment 19 is a method of making an adhesive formulation, the method comprising:

inducing crosslinking in a portion of phthalonitrile moieties of an etherimide-phthalonitrile oligomer having formula

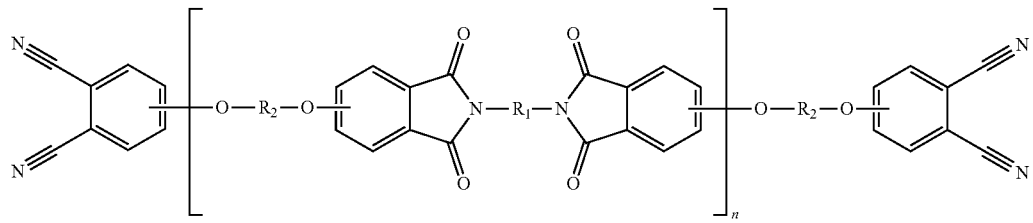

wherein $R_1$ is an unsubstituted or substituted aryl group or an unsubstituted or substituted cycloalkyl group; $R_2$ is an unsubstituted or substituted aryl group and n has a value of from 1 to 30, to form a prepolymer; and combining the prepolymer with a liquid medium to form an adhesive formulation.

An embodiment 20 is the method of embodiment 19, further comprising synthesizing the etherimide-phthalonitrile oligomer by reacting a bisimide monomer, a diol, and a phthalonitrile endcapper, wherein the bisimide monomer has formula

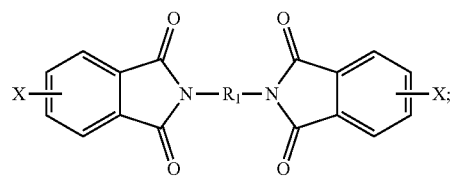

the diol has formula HO—$R_2$—OH; and
the phthalonitrile endcapper has formula

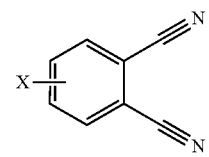

wherein X is $NO_2$, or a halogen.

An embodiment 21 is method of using the adhesive formulation of any of embodiments 15-18, the method comprising heating the adhesive formulation according to a curing profile to form a poly(etherimide-phthalonitrile) thermoset polymer.

An embodiment 22 is a poly(etherimide-phthalonitrile) thermoset polymer formed by curing the adhesive formulation of embodiment 15.

An embodiment 23 is the poly(etherimide-phthalonitrile) thermoset polymer of embodiment 22 having a degradation temperature of greater than 450° C., an average maximum load of from 300 psi to 6,000 psi, or both.

An embodiment 24 is an adhesive article comprising a substrate and a layer of the adhesive formulation of any of embodiments 15-18 on a surface of the substrate, optionally, wherein the layer is cured to form a poly(etherimide-phthalonitrile) thermoset polymer.

An embodiment 25 is the adhesive article of embodiment 24, wherein the substrate is a metal, a metal alloy, a composite thereof, or combinations thereof.

An embodiment 26 is an etherimide-phthalonitrile oligomer having formula

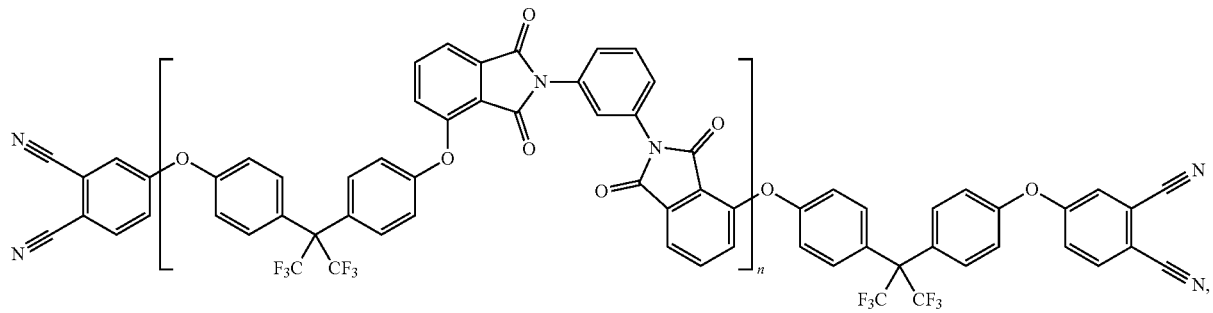

wherein n has a value of from 1 to 30.

Other features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1 shows schematics of illustrative adhesive articles comprising any of the disclosed adhesive formulations.

DETAILED DESCRIPTION

Provided herein are phthalonitrile adhesive formulations and methods of making and using the adhesive formulations.

Definitions

Alkyl group refers to a linear, branched or cyclic alkyl group in which the number of carbons may range from, e.g., 1 to 24, 1 to 12, 1 to 6, or 1 to 4. A cyclic alkyl group may be referred to as a cycloalkyl group. Cycloalkyl groups include those such as cyclopentyl, cyclohexyl, and the like. The alkyl group may be unsubstituted, by which it is meant the alkyl group contains no heteroatoms. The alkyl group may be substituted, by which it is meant an unsubstituted alkyl group in which one or more bonds to a carbon(s) or hydrogen(s) are replaced by a bond to non-hydrogen and non-carbon atoms.

Alkenyl group refers to a mono- or polyunsaturated, linear, branched or cyclic alkenyl group in which the number of carbons may range from, e.g., 2 to 24, 2 to 12, 2 to 6, etc. The alkenyl group may be unsubstituted or substituted as described above with respect to alkyl groups.

Aryl group refers to a monocyclic aryl group having one aromatic ring (e.g., benzyl, phenyl) or a polycyclic group having fused aromatic rings (e.g., two, three, etc. rings). Monocyclic aryl groups may be unsubstituted or substituted as described above with respect to alkyl groups. However, substituted monocyclic aryl groups also refer to an unsubstituted monocyclic aryl group in which one or more carbon atoms are bonded to an unsubstituted or substituted alkane, an unsubstituted or substituted alkene, or an unsubstituted or substituted monocyclic aryl group or a polycyclic aryl group. The meaning of unsubstituted and substituted alkanes and unsubstituted and substituted alkenes follows the meaning described above for unsubstituted and substituted alkyl and alkenyl groups, respectively. Polycyclic aryl groups are unsubstituted.

Regarding substituents, non-hydrogen and non-carbon atoms include, e.g., a halogen atom in halides such as F, Cl, Br, and I; an oxygen atom in groups such as hydroxyl groups, alkoxy groups, aryloxy groups, carbonyl groups, carboxyl groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, enamines, imines, oximes, hydrazones, and nitriles; and a phosphorus atom in groups such as phosphines, and phosphoryls.

A phthalonitrile moiety refers to a portion of a molecule, compound, and the like, the portion having the following structure:

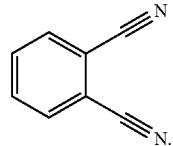

The term "crosslink" and the like refer to covalent bonds formed between cyano groups on different phthalonitrile moieties induced by heat and generally, a curing agent.

Etherimide-Phthalonitrile Oligomer

The etherimide-phthalonitrile oligomer of the present adhesive formulations is the reaction product of a bisimide monomer, a diol, and a phthalonitrile endcapper. The bisimide monomers themselves are also encompassed by the present disclosure. The bisimide monomer is the reaction product of an anhydride and either a diamine or a diisocyanate. The anhydride is generally a substituted phthalic anhydride comprising a phenol-reactive group, e.g., $NO_2$, a halogen. In embodiments, the halogen is F or Cl. The anhydride may be represented by the formula

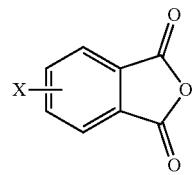

wherein X is the phenol-reactive group, bound to any available position on the benzene ring of the phthalic anhydride.

The diamine to be reacted with the anhydride may be represented by the formula $H_2N—R_1—NH_2$. The diisocyanate to be reacted with the anhydride may be represented by the formula $OCN—R_1—NCO$. In both cases, $R_1$ is an unsubstituted or substituted aryl group or an unsubstituted or substituted cycloalkyl group. In embodiments, $R_1$ is monocyclic. In embodiments, $R_1$ is substituted or unsubstituted benzene or unsubstituted or substituted cyclohexane. In embodiments, $R_1$ is polycyclic having two or more (e.g., 3, 4, etc.) unfused monocyclic rings. In such embodiments, neighboring unfused monocyclic rings may be connected directly or via a group such as a heteroatom (e.g., O), a sulfone group ($SO_2$), or an unsubstituted or substituted alkyl group (e.g., hexafluoroisopropyl). Illustrative diamines include o-phenylenediamine, m-phenylenediamine, p-phenylenediamine, 3,4'-oxydianiline, 4,4'-oxydianiline, 4-aminophenyl sulfone, 4,4'-diaminodiphenylmethane, 2,4-diaminotoluene, o-tolidine, 4,4'-(hexafluoroisopropylidene)dianiline, 4,4'-(1,3-phenylenedioxy)dianiline, 4,4'-hexafluoroisopropylidene)bis(p-phenyleneoxy)dianiline, and 4,4'-bis(3-aminophenoxy)diphenylsulfone. Illustrative diisocyanates include toluene 2,4-diisocyanate, 4,4'-methylenebis(phenyl isocyanate), 1,4-phenylene diisocyanate, 1,3-phenylene diisocyanate, and isophorone diisocyanate. A single type of diamine/diisocyanate or multiple, different types of diamine/diisocyanate may be used in the synthesis of the bisimide monomer.

Synthesis of the bisimide monomer involves combining the anhydride and the diamine/diisocyanate in a solvent(s) under appropriate conditions to induce reaction of the phenol-reactive group of the anhydride with the diamine/diisocyanate. Suitable solvent(s) include those in which the reactants (diamine/diisocyanate, anhydride) dissolve such as dimethylformamide, toluene, dimethylsulfoxide, N-methyl-2-pyrrolidone. These conditions generally include use of an elevated temperature (i.e., greater than room temperature). The temperature may be that at which an azeotrope with water forms in the reaction mixture, i.e., the azeotropic temperature. Suitable temperatures include those of from 100° C. to 200° C., from 130° C. to 200° C., and from 130° C. to 160° C. The reaction may be carried out using a Dean-Stark trap or similar apparatus for removal of reaction by products such as water, $CO_2$, etc. Mixing may be used during the reaction, e.g., mixing from 100 rpm to 500 rpm. Recovery of the bisimide monomer from the reaction mixture may be carried out via precipitation in an appropriate solvent, e.g., methanol. The recovered bisimide monomer may be further dried, e.g., using heat (e.g., at from 50° C. to 100° C.) and vacuum. Other illustrative details of bisimide monomer synthesis are described in the Examples, below.

The resulting bisimide monomer may be represented by the formula

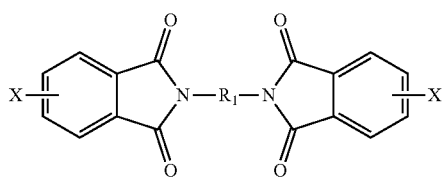

wherein X is defined above with respect to the anhydride and $R_1$ is as defined above with respect to the diamine/diisocyanate.

The diol used to form the etherimide-phthalonitrile oligomer may be represented by the formula $HO—R_2—OH$, wherein $R_2$ is an unsubstituted or substituted aryl group. In embodiments, $R_2$ is monocyclic. In embodiments, $R_2$ is unsubstituted benzene. In embodiments, $R_2$ is polycyclic having two or more unfused monocyclic rings. In embodiments, $R_2$ is polycyclic having two unfused monocyclic rings. Neighboring unfused monocyclic rings may be connected directly or via one or more groups such as a ketone group, an ether group, a urethane group, a urea group, an amide group, an imide group, an ester group, a sulfone group, an alkyl group, an oxamide, or an alkylene group. Any of these groups may be unsubstituted or substituted. Here, a ketone group may refer to —C(O)—; an ether group may refer to —O—; a urethane group may refer to —NHC(O)O—; a urea group may refer to —NHC(O)NH—; an amide group may refer to —C(O)NH—; an imide group may refer to —C(O)NC(O)—; an ester group may refer to —C(O)O—; and an oxamide group may refer to —NHC(O)C(O)NH—. In each case, the "—" denotes the covalent linkage to the unfused monocyclic rings, which may be a direct covalent linkage. In embodiments, neighboring unfused monocyclic rings are connected directly or via a single group such as a sulfone group, an unsubstituted or substituted alkyl group, or an unsubstituted or substituted alkylene group. Illustrative diols include 4,4'-sulfonyldiphenol, Bisphenol A, Bisphenol F, Bisphenol B, Bisphenol AF, 4,4'-dihydroxybiphenyl, hydroquinone, 4,4'-dihydroxystilbene, and 3,4'-dihydroxystilbene. A single type of diol or multiple, different types of diols may be used in the synthesis of the bisimide monomer.

The phthalonitrile endcapper is a substituted 1,2-dicyanobenzene. The substituent on the 1,2-dicyanobenzene may be the same substituent X as on the anhydride described above, e.g., $NO_2$, F, Cl. The phthalonitrile endcapper may be represented by the formula

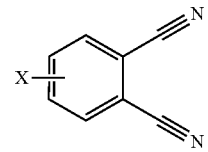

wherein X is defined above with respect to the anhydride.

Synthesis of the etherimide-phthalonitrile oligomer may be carried out using a process similar to that described above for the bisimide monomer. The bisimide monomer, the diol, and the phthalonitrile endcapper may be combined and reacted together, or the phthalonitrile endcapper may be separately added and reacted later. Illustrative details of etherimide-phthalonitrile oligomer synthesis are described in the Examples, below.

The etherimide-phthalonitrile oligomer may be represented by the formula

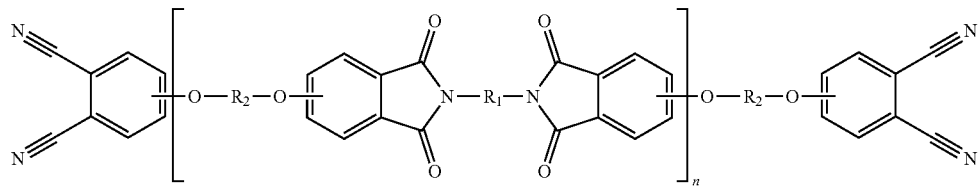

wherein $R_1$ is as defined above with respect to the diamine/diisocyanate and $R_2$ is as defined above with respect to the diol. The synthesis of the etherimide-phthalonitrile oligomer generally results in different numbers of the etherimide linking group being incorporated between the two terminal phthalonitrile moieties and a corresponding distribution of molecular weights. Thus, "n" is used to denote the number of linking groups that are incorporated, on average. The value of n (and thus, the molecular weight of the etherimide-phthalonitrile oligomer) may be controlled by selecting various relative ratios of the bisimide monomer and the diol in the synthesis described above. In embodiments, the value of n is in a range of from 1 to 30. This includes from 1 to 25, from 1 to 20, from 1 to 15, from 1 to 10, from 1 to 5, and from 1 to 3. Gel phase chromatography in an appropriate solvent or end group analysis via $^{13}C$ NMR may be used to determine the value of n as well as the molecular weight. In the present disclosure, the term "etherimide-phthalonitrile oligomer" encompasses each of the etherimide-phthalonitrile compounds formed by the reaction of the bisimide monomer, the diol, and the phthalonitrile endcapper, each of which may have a different number of the etherimide linking group(s) and a different molecular weight.

An illustrative etherimide-phthalonitrile oligomer is shown below. The value of n may be from 1 to 30. This includes from 1 to 25, from 1 to 20, from 1 to 15, from 1 to 10, from 1 to 5, and from 1 to 3.

herein, i.e., the terms are used to refer to chemical distinct compounds. However, like the etherimide-phthalonitrile oligomers, the bisphthalonitrile compound also comprises two terminal phthalonitrile moieties which are connected via one or more linking groups. In the case of the bisphthalonitrile compound, suitable linking groups include an aromatic ether, a thioether, an imide, a sulfone, a heterocyclic ether, an aromatic ketone, a urethane, a urea, an amide, an ester, an oxamide, and combinations thereof. Such bisphthalonitrile compounds are commercially available or may be formed using known synthetic methods. Similar to the etherimide-phthalonitrile oligomer, different numbers of the linking group(s) may end up being incorporated into the bisphthalonitrile compounds between the two terminal phthalonitrile moieties and a corresponding distribution of molecular weights. The term "bisphthalonitrile compound" refers to each of the bisphthalonitrile compounds that may be formed, each of which may have a different number of the linking group(s) and a different molecular weight. Illustrative bisphthalonitrile compounds include those described in U.S. Pat. No. 8,222,403; U.S. Pat. Pub. No. 20170002146; International Pat. Pub. No. 2014021946; and International Pat. Pub. No. 2018175025; the disclosures of each of which are incorporated by reference for purposes of the bisphthalonitrile compounds.

In embodiments, the bisphthalonitrile compound comprises at least one aromatic ether linking group and at least one aromatic ketone linking group between the two terminal phthalonitrile moieties. Such bisphthalonitrile compounds may be formed using known synthetic methods, e.g., involv-

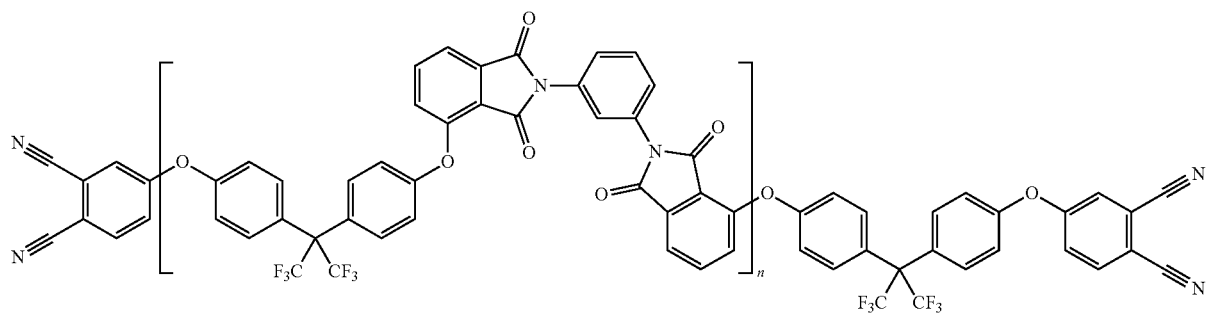

Bisphthalonitrile Compounds

In addition to the etherimide-phthalonitrile oligomer, the present adhesive formulation may further comprise a bisphthalonitrile compound. A single type or combinations of different types of bisphthalonitrile compounds may be used. The term "bisphthalonitrile compound" is distinguished from the etherimide-phthalonitrile oligomers described ing the reaction of a dihydroxyaromatic with a dihaloaromatic such as dihalobenzophenone, followed by endcapping with 4-nitrophthalonitrile. An illustrative such bisphthalonitrile compound is formed using bisphenol A as the dihydroxyaromatic and dichlorobenzophenone as the dihaloaromatic. Such a bisphthalonitrile compound may be represented by the formula

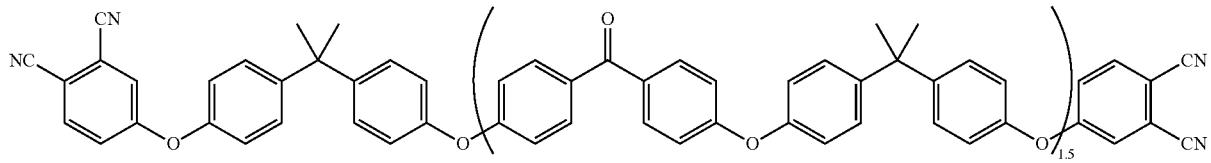

As is shown, on average, the number of the linking groups (n) is end capping 1.5. Such a bisphthalonitrile compound may be obtained commercially, e.g., Bis A Oligomeric Phthalonitrile Composition from the Naval Research Laboratory. However, other similar bisphthalonitrile compounds may be used, e.g., those based on other dihydroxyaromatics, including other bisphenols. Illustrative dihydroxyaromatics include bisphenol A6F, resorcinol, 2,2-bis(4-hydroxyphenyl)propane, 2,2-bis(4-hydroxyphenyl)-1,1,1,3,3,3-hexafluoropropane, and the like.

Any desired amount of a bisphthalonitrile compound may be used in addition to the etherimide-phthalonitrile oligomer. When present, a weight ratio of the (bisphthalonitrile compound):(etherimide-phthalonitrile oligomer) may be in a range of from 100:1 to 1:100. This includes from 75:1 to 1:75, from 50:1 to 1:50, from 25:1 to 1:25, and from 1:10 to 10:1 When multiple types of bisphthalonitrile compounds and/or etherimide-phthalonitrile oligomers are used, these amounts refer to the total amount of the multiple bisphthalonitrile compounds/etherimide-phthalonitrile oligomers.

In embodiments, however, bisphthalonitrile compounds are not used and the adhesive formulation is free of any such bisphthalonitrile compounds (other than the present etherimide-phthalonitrile oligomers).

Phthalonitrile Additives

The present adhesive formulation may further comprise a phthalonitrile additive. A single type or combinations of different types of phthalonitrile additive may be used. Phthalonitrile additives are small molecules comprising one or more phthalonitrile moieties (e.g., 2 such moieties). The additives are distinguished from the oligomers, prepolymers, and thermoset polymers described herein. Although the bisphthalonitrile compound of the phthalonitrile precursor composition may also be a small molecule, the bisphthalonitrile compound is a different compound, i.e., a different chemical species, from the phthalonitrile additive. Similarly, curing agents and phthalonitrile additives refer to different compounds. Illustrative phthalonitrile additives include those described in U.S. patent application Ser. No. 16/863,052, PHTHALONITRILE ADHESIVE FORMULATIONS AND RELATED METHODS, filed Apr. 30, 2020, which is hereby incorporated by reference in its entirety.

Any desired amount of a phthalonitrile additive may be used. When present, an amount of from 2 mol % to 30% may be used. The term "mol %" refers to the mole percentage of the phthalonitrile additive as compared to the total moles of the phthalonitrile additive, the etherimide-phthalonitrile oligomer, and the bisphthalonitrile compound (if present). The amount includes from 2 mol % to 25 mol %, from 5 mol % to 20 mol %, and from 5 mol % to 15 mol %. When multiple types of phthalonitrile additives are used, these amounts refer to the total amount of the multiple phthalonitrile additives.

In embodiments, however, phthalonitrile additives are not used and the adhesive formulation is free of any such phthalonitrile additives.

Curing Agents

Generally, the present adhesive formulations comprise a curing agent, although in embodiments, this is not necessary. The curing agents include those capable of inducing cross-linking reactions between phthalonitrile moieties, i.e., reactions between cyano groups on phthalonitrile moieties to form covalent crosslinks. These covalent crosslinks may include polytriazine-type, polyindoline-type, phthalocyanine-type crosslinks, and combinations thereof. A single type or combinations of different types of curing agents may be used. If a curing agent is not included, these types of crosslinking reactions may still occur, albeit at a slower rate.

Illustrative curing agents include amines, diamines, phenolics, acids, metals, metal salts, and combinations thereof. Regarding diamines, illustrative curing agents include 4,4'-(1,3-phenylenedioxy)dianiline; 4,4'-(1,4-phenylenedioxy)dianiline; bis[4-(4-aminophenoxy)phenyl]sulfone; 4,4'-(4,4'-isopropylidenediphenyl-1,1'-diyldioxy)dianiline; 4,4'-(1,3-phenylenediisopropylidene)dianiline; 4,4'-(1,4-phenylenediisopropylidene)dianiline; 4,4'-(1,1'-biphenyl-4,4'-diyldioxy)dianiline, 4,4'-methylenedianiline; 4,4'-sulphonyldianiline; 4,4'-methylene-bis(2-methylaniline); 3,3'-methylenedianiline; 3,4'-methylenedianiline; 4,4'-oxydianiline; 4,4'-(isopropylidene)dianiline; 4,4'-(hexafluoroisopropylidene)dianiline; 4,4'-(hexafluoroisopropylidene)bis(p-phenyleneoxy)dianiline; 4,4'-diaminobenzophenone; and melamine. Regarding phenolics, hydroxyquinone is an illustrative curing agent. Regarding metals and metal salts, illustrative curing agents include copper acetylacetonate, palladium acetylacetonate, cobalt acetylacetonate, nickel acetylacetonate, and iron acetylacetonate. Other illustrative curing agents include those described in U.S. Pat. Nos. 4,408,035; 4,410,676; 5,247,060; 8,735,532; 8,921,510; and International Pat. Pub. No. 2014021946; the disclosures of each of which are incorporated by reference for purposes of the curing agents.

Any desired amount of a curing agent may be may be used. When present, an amount of from 1 weight % to 10 weight % may be used. Here, weight % refers to the total amount of the curing agent as compared to the total amount of the curing agent, the etherimide-phthalonitrile oligomer, the bisphthalonitrile compound (if present), and the phthalonitrile additive (if present). The amount includes from 2 weight % to 8 weight %, and from 2 weight % to 5 weight %. When multiple types of curing agents are used, these amounts refer to the total amount of the multiple curing agents.

In embodiments, the phthalonitrile moieties in the adhesive formulations (i.e., those of the etherimide-phthalonitrile oligomer and if present, the other phthalonitrile components (bisphthalonitrile compound and/or phthalonitrile additive) are uncrosslinked. This means that the etherimide-phthalonitrile oligomer and if present, the other phthalonitrile components have not been exposed to conditions to induce crosslinking reactions to provide the resulting covalent crosslinks described above. This does not necessarily mean that there are no such crosslinks in the adhesive formulation, but that the amount is too small to have a material effect on the adhesive formulation.

In other embodiments, however, a portion (less than all) of the phthalonitrile moieties in the adhesive formulations are crosslinked. This may be accomplished by exposing the etherimide-phthalonitrile oligomer and if present, the other phthalonitrile components to conditions to induce crosslinking reactions so as to achieve partial curing. In these embodiments, it can be useful to also include a curing agent. Conditions to achieve partial curing are different than those used to convert the adhesive formulation into a thermoset polymer, and involve lower temperatures and/or shorter times. Thus, the number of covalent crosslinks, i.e., the degree of crosslinking, achieved during partial curing is less than in the thermoset polymer. Although the conditions to achieve partial curing will depend upon the type of etherimide-phthalonitrile oligomer, illustrative conditions include heating at a temperature of no more than 250° C. for no more than 120 minutes. This includes a temperature in a range of from 175° C. to 250° C. or 190° C. to 210° C. for from 20 minutes to 120 minutes or from 80 minutes to 100 minutes.

The result of partial curing converts a portion (less than all) of the etherimide-phthalonitrile oligomer and if present, a portion (less than all) of the other phthalonitrile components to a prepolymer comprising the covalent crosslinks described above. However, uncrosslinked/unreacted components generally remain so that the prepolymer and thus, the adhesive formulation also comprises these uncrosslinked/unreacted components. The present prepolymers may be referred to herein as etherimide-phthalonitrile prepolymers.

Morphology

The present adhesive formulations may be in the form of a solid. The term "solid" encompasses various morphologies including particles, powder, and the like.

Other forms that the adhesive formulations may adopt include pastes and sprays. These other forms are distinguished from solids by further including a liquid medium. These other forms are distinguished from each another generally by including different amounts of the liquid medium and having different shear viscosities. For example, pastes may be characterized by a shear viscosity of greater than 1,000 cps, greater than 10,000 cps, greater than 100,000 cps, or in a range of from 1,200 to 500,000 cps, all as measured at room temperature and 100 Hz. Sprays may be characterized by a shear viscosity of less than 300 cps, less than 150 cps, less than 50 cps, or in a range from 0.5 to 250 cps, all as measured at room temperature and 100 Hz. In both cases, these shear viscosities may be measured using a Malvern viscometer with a parallel plate geometry (25 mm plate, 0.20 mm gap) and a shear rate range from 0.1 Hz to 1000 Hz.

Another form for the adhesive formulations is that of a composite film (also referred to as a "prepreg"). The composite films also generally include an amount of the liquid medium as well as a non-woven or woven fibrous material comprising a plurality of fibers, such as a scrim comprising glass fibers, carbon fibers, alumina fibers, ceramic fibers, or combinations thereof. The liquid medium having the etherimide-phthalonitrile oligomer, the other phthalonitrile components (if present), the curing agent (if present) dispersed or dissolved therein are infiltrated into the fibrous material.

The liquid medium may comprise one or more solvents, e.g., organic solvents. Illustrative solvents include alcohols and ketones such as acetone, methyl ethyl ketone, methyl propyl ketone, methyl isobutyl ketone, n-butyl acetate, 2-phenoxyethanol, N-methylpyrrolidone. These are examples of polar organic solvents. Other illustrative solvents include nonpolar organic solvents such as toluene, xylene, and benzene. The amount of liquid medium (as well as the relative amounts of different types of solvents, if more than one type is used) used depends on the desired form of the adhesive formulation. However, in embodiments, the amount of liquid medium is at least 30 weight % as compared to the total weight of the adhesive formulation (excluding the fibrous material, if present). This includes at least 40 weight %, at least 50 weight %, at least 60 weight %, and in a range of from 30 weight % to 80 weight %. The combined amount of the etherimide-phthalonitrile oligomer, the other phthalonitrile components (if present), and the curing agent (if present) may be no more than 10 weight % as compared to the total weight of the adhesive formulation (excluding the fibrous material, if present). This includes no more than 20 weight %, no more than 40 weight %, no more than 50 weight %, no more than 70 weight %, and in a range of from 15 weight % to 65 weight %. As noted above, the etherimide-phthalonitrile oligomer, the other phthalonitrile components (if present), and the curing agent (if present) may be present as an etherimide-phthalonitrile prepolymer comprising both crosslinked and uncrosslinked/unreacted components. In such embodiments, these amounts refer to the amount of etherimide-phthalonitrile prepolymer in the adhesive formulation.

Additives

The present adhesive formulations may comprise a variety of other optional additives, which refers to species chemically distinct from the etherimide-phthalonitrile oligomers, etherimide-phthalonitrile prepolymers, bisphthalonitrile compounds, phthalonitrile additives, and curing agents described herein. Fillers may be used as additives. Fillers are generally non-reactive with respect to the etherimide-phthalonitrile oligomer and if present, the other phthalonitrile components, but rather may be added to tune the properties of the adhesive formulation and the thermoset polymer formed therefrom. Thus, the types of fillers used and their amounts may be selected depending upon the desired use for the adhesive formulation and the thermoset polymer. Combinations of different types of fillers may be used.

Illustrative fillers include carbon-based fillers such as carbon black (e.g., Super P), graphite, carbon fiber, and the like. Other fillers include metallic fillers such as nickel, silver, copper, gold, platinum, iridium, iron, titanium, zinc, and the like. Metallic fillers also include alloys comprising such metals such as stainless steel, nichrome, and the like. Other fillers include metal oxide fillers such as silica, fumed silica (e.g., Aerosil® F972), alumina, iron oxide, and the like. Other fillers include polymeric fillers such as those composed of a polyaryletherketone (e.g., polyetheretherketone (PEEK), polyetherketoneketone (PEKK)), a polyetherimide, and the like.

The morphology of the fillers is not particularly limited. The fillers may be particulate in form and have an aspect ratio of less than 2 (encompassing spherical shapes, elliptical shapes, and the like) or have an aspect ratio of greater than 2 (encompassing elongated shapes such as wires, rods, tubes, whiskers, fibers, needles, and the like). Similarly, the dimensions of the fillers are not particularly limited. The fillers may have a nanoscale dimension in which one, two, or all three dimensions are 1000 nm or less. The fillers may have a microscale dimension in which one, two, or all three dimensions are in a range of from 1 μm to 1 mm.

In embodiments, a filler is present in the adhesive formulation at an amount of from 0.001 weight % to 10 weight % as compared to the total weight of the adhesive formulation (excluding the fibrous material, if present). This includes from 0.01 weight % to 10 weight %, and from 0.1 weight % to 10 weight %. When multiple fillers are used, these weight percentages refer to the total weight of the multiple fillers.

Other additives which may be included in the adhesive formulations include dispersants, flow agents, cure promoters, surfactants, the like, and combinations thereof. Reactive additives may be included such as allylic additives. Again, a variety of types of these components may be added to tune the properties of the adhesive formulation and the thermoset polymer formed therefrom. When present, they may be included in amounts described above with respect to the fillers.

In embodiments, the present adhesive formulation consists of one or more types of an etherimide-phthalonitrile oligomer; optionally, one or more types of a bisphthalonitrile compound; optionally, one or more types of a phthalonitrile additive; optionally, and one or more types of a curing agent; optionally, one or more types of a solvent; and optionally, one or more types of an additive. In embodiments, the adhesive formulation consists of one or more types of an etherimide-phthalonitrile oligomer; one or more types of a curing agent; one or more types of an additive; one or more types of a solvent; and optionally, one or more types of a bisphthalonitrile compound. In any of these embodiments, the etherimide-phthalonitrile oligomer may be present as an etherimide-phthalonitrile prepolymer. Any of the etherimide-phthalonitrile oligomers, etherimide-phthalonitrile prepolymers, bisphthalonitrile compounds, phthalonitrile additives, curing agents, solvents, and additives disclosed herein may be used in any combination without limitation.

In any of these embodiments, the adhesive formulation may be in the form of a spray, a paste, or a composite film.

Methods

The adhesive formulations may be formed by combining and mixing the etherimide-phthalonitrile oligomer and any other desired components at the desired amounts. As noted above, the etherimide-phthalonitrile oligomer, the other phthalonitrile components (if present), and the curing agent (if present) may be present as an etherimide-phthalonitrile prepolymer, which may be combined and mixed with any other desired components and the desired amounts. Pastes, sprays, and composite films may also be made according to the techniques described in U.S. Pat. Application No. 63/139,327, METHODS FOR PREPARING PHTHALONITRILE COATING COMPOSITIONS, filed Jan. 20, 2021, which is hereby incorporated by reference in its entirety.

The adhesive formulations may be used in a variety of environments, including the aerospace industry, the automobile industry, the submarine industry, the electronics industry, the construction industry, and the like. Thus, the phrases "aerospace industry," "automobile industry," and "submarine industry" may refer to any device, craft, machine, or components thereof used in the industries such as aircraft, an airplane, a rotocraft, a boat, a submarine, a space ship, a trajectory device, a drone, a satellite, an automobile, a bus, a locomotive, a train car, and the like.

As shown in FIG. 1, any of the disclosed adhesive formulations may be applied onto a surface of a substrate 104 to form a coating 106 thereon to provide a coated adhesive article 100. The substrate 104 may be a component used in any of the industries listed above and composed of any type of material, e.g., metal, metal alloy, glass, a composite, and the like. The application technique depends upon the form of the adhesive formulation. For example, pastes may be applied by spreading, painting, brushing, wiping, etc., while sprays are sprayed using any number of spraying techniques (e.g., spray gun). Composite films may be applied by pressing, molding, etc. The resulting coating may have any desired thickness, e.g., in a range of from 0.1 mm to 100 mm. The thickness also depends upon the form of the adhesive formulation used. In any of the embodiments, a second substrate 108 may be placed on the coating 106 which functions to adhere the two substrates 104, 108 together to form a bonded adhesive article 102.

In whichever environment and for whichever application they are to be used, the adhesive formulations (or coatings formed therefrom) are generally cured to form a thermoset polymer therefrom. The cured, thermoset polymer formed from any of the disclosed adhesive formulations may be referred to herein as a poly(etherimide-phthalonitrile) thermoset. Such curing involves heating for a period of time, generally, in an inert environment. The temperatures and/or times are greater than those used to achieve the partial curing described above so as to increase (e.g., maximize) the degree of crosslinking between phthalonitrile moieties. The curing may be carried out according to a curing profile involving holds at certain temperatures for certain periods of times. The curing profile may also involve use of certain heating rates to achieve the different temperatures. Various curing profiles may be used, depending upon the selected adhesive formulation and the desired properties for the thermoset polymer. An illustrative curing profile is provided in the Example, below. Another illustrative curing profile is 200° C. (30 minutes), 250° C. (90 minutes), 300° C. (180 minutes), 350° C. (90 minutes), 375° C. (60 minutes). The present methods may further comprise curing to convert the adhesive formulation (or coating formed therefrom) to a thermoset polymer.

The adhesive articles and thermoset polymers formed using the methods described above are also encompassed by the present disclosure.

Properties

The present etherimide-phthalonitrile oligomers and prepolymers may be characterized by their solubility in certain solvents. The solubility may be measured as described in the Examples below (see Table 3). In embodiments, a 5 weight % amount of the etherimide-phthalonitrile oligomers/prepolymers are fully soluble in each of N-methylpyrrolidone, dimethylsulfoxide, acetone, 2-butanone, ethyl acetate, and 4-methyl-2-pentanone.

Poly(etherimide-phthalonitrile) thermoset polymers formed from the present adhesive formulations may be characterized by certain properties, including thermooxidative stability. The thermooxidative stability may be referenced as a degradation temperature, which refers to the temperature at which 5% mass loss occurs. The degradation temperature may be measured using a thermogravimetric analyzer (e.g., TGA Q500) as described in the Examples, below (see Table 1). In embodiments, the degradation temperature is greater than 450° C., greater than 475° C., or greater than 500° C. Thermooxidative stability may also be referenced as a weight % of the thermoset polymer remaining after exposing the thermoset polymer to a temperature of about 399° C. in air for about 12 hours as described in the Example below (see Table 2). In embodiments, the remaining weight % is at least 70%, at least 75%, or at least 80%.

Poly(etherimide-phthalonitrile) thermoset polymers formed from the present adhesive formulations may also be characterized by adhesive strength. Adhesive strength may be referenced as a maximum load measured as described in the Example below (see Table 4). In embodiments, the maximum load is in a range of from 300 psi to 6,000 psi.

This includes from 300 psi to 3,000 psi and from 300 psi to 1,500 psi. These may be average values as measured from a representative number of samples, e.g., 3.

EXAMPLES

Materials 4,4'-hexafluoroisopropylbisphenol (Bisphenol AF), meta-phenylene diamine (m-PDA), para-phenylene diamine (p-PDA), 4,4'-bis(3-aminophenoxy)diphenylsulfone (m-BAPS), potassium carbonate ($K_2CO_3$), 4-nitrophthalic anhydride, 4-nitrophthalonitrile, bismaleimide (BMI), 4-aminophthalonitrile, N,N-dimethylformamide (DMF), N-methylpyrrolidone (NMP), toluene, dimethylsulfoxide (DMSO), acetone, ethyl acetate and isopropyl alcohol were purchased from the Sigma Aldrich and used as received. 4-Methyl-2-pentanone (MIBK) and 2-butanone (MEK) were purchased from Sigma Aldrich and dried prior to use. Bisphenol A oligomeric phthalonitrile composition (Bis A PN) containing 3% by weight of an amine catalyst (m-BAPS) was purchased from the Naval Research Laboratory and used as received. Ketaspire KT-820 UFP was purchased from Solvay Specialty Polymers and used as received. Aerosil® R 972 fumed silica was purchased from Evonik Resource Efficiency GmbH and used as received.

Example 1

Synthesis of Bis-Nitroimide Monomers (m-PDA-BNI)

To a round-bottomed flask equipped with a Dean-Stark trap with condenser and a nitrogen inlet, meta-phenylenediamine (m-PDA) (5.42 g, 50.16 mmol) and 4-nitrophthalic anhydride (19.37 g, 100.31 mmol) were charged and dissolved with DMF (55 g) and toluene (20 mL). The resulting mixture was reacted at 180° C. to azeotrope water for 6 hours, cooled to ambient temperature, and poured into methanol forming a yellow precipitate. The material was collected in a Buchner funnel, washed with methanol and dried in vacuo (92% yield, 22.2 g).

Example 2

Synthesis of Bis-Nitroimide Monomers (TDI-BNI)

To a round-bottomed flask equipped with a nitrogen inlet and outlet, toluene diisocyanate (1.90 g, 11.91 mmol) and 4-nitrophthalic anhydride (4.312 g, 22.36 mmol) were charged and dissolved with DMF (20 g). The reaction mixture was slowly heated to 200° C., during which carbon dioxide evolution occurred. Once all gas evolution stopped, the reaction mixture was cooled to ambient temperature and poured into methanol forming a yellow precipitate. The material was collected in a Buchner funnel, washed with methanol, and dried in vacuo (96% yield, 4.9 g).

Example 3

Synthesis of Polyetherimide Phthalonitrile Oligomers n=1 (PEI-PN-1)

To a round-bottomed flask equipped with a Dean-Stark trap with condenser and a nitrogen inlet, m-PDA-BNI (5.35 g, 11.67 mmol), Bisphenol AF (7.84 g, 23.34 mmol), and potassium carbonate (3.45 g, 25.00 mmol) were charged and dissolved in NMP (55 mL), DMF (10 mL) and toluene (20 mL). The mixture was reacted at 170° C. to azeotrope off water for 6 hours. After 6 hours, the reaction mixture was cooled to 70° C. and 4-nitrophthalonitrile (4.04 g, 23.34 mmol) was added. The mixture was reacted for 4 hours and precipitated into 5% HCl forming a yellow precipitate. The yellow solid was collected in a Buchner funnel and washed with water until neutral. The solvent was removed in vacuo to dry.

Example 3.1

B-Staging of PEI-PN-1

A 6" diameter crystallization dish was lined with aluminum foil. PEI-PN-1 (10 g) and m-BAPS (0.3 g) were poured into the crystallization dish and spread evenly. The dish was placed in a 200° C. furnace in air and allowed to heat for 75 minutes. The crystallizing dish was then removed from the oven and the product allowed to quench cool at room temperature until it became a frangible solid (usually within 1 minute). The solid was then peeled off the aluminum foil and ground up using a mortar and pestle until it became a rough powder (PEI-PN-1 prepolymer).

Example 3.2

Paste Formulation—PEI-PN-1

4.5 g B-staged PEI-PN-1 (Example 3.1), 0.4 g Ketaspire KT-820 UFP, 3.0 g MIBK, 0.01 g Aerosil® R972, and four 0.2" diameter glass beads were added to a mixing cup. This solution was mixed in a centrifugal mixer at 1500 rpm for 4 minutes. The cup was then sealed using parafilm and allowed to sit for seven days. The resulting solution was a semi-viscous paste that can be buttered onto substrates using a spatula or similar tool.

Example 4

Synthesis of Polyetherimide Phthalonitrile Oligomers n=2 (PEI-PN-2)

To a round-bottomed flask equipped with a Dean-Stark trap with condenser and a nitrogen inlet, m-PDA-BNI (7.13 g, 15.56 mmol), Bisphenol AF (7.84 g, 23.34 mmol), and potassium carbonate (3.45 g, 25.00 mmol) were charged and dissolved in NMP (55 mL) and toluene (20 mL). The mixture was reacted at 170° C. to azeotrope off water for 6 hours. After 6 hours, the reaction mixture was cooled to 70° C. and 4-nitrophthalonitrile (2.69 g, 15.564 mmol) was added. The mixture was reacted for 4 hours and precipitated into 5% HCl forming a yellow precipitate. The yellow solid was collected in a Buchner funnel and washed with water until neutral. The solvent was removed in vacuo to dry.

Example 4.1

B-Staging of PEI-PN-2

A 6" diameter crystallization dish was lined with aluminum foil. PEI-PN-2 (10 g) and m-BAPS (0.3 g) were poured into the crystallization dish and spread evenly. The dish was placed in a 200° C. furnace in air and allowed to heat for 75 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (PEI-PN-2 prepolymer).

Example 5.1

B-Staging of PEI-PN-1 Blend

A 6" diameter crystallization dish was lined with aluminum foil. Bis A PN (9 g), PEI-PN-1 (1 g), and m-BAPS (0.3 g) were poured into the crystallization dish and spread evenly. The dish was placed in a 200° C. furnace in air and allowed to heat for 75 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (PEI-PN-1 blend prepolymer).

Example 5.2

Paste Formulation—PEI-PN-1 Blend 5.5 g PEI-PN-1 blend prepolymer (Example 5.1), 0.5 g Ketaspire KT-820 UFP, 3.99 g MIBK, 0.01 g Aerosil® R972, and four 0.2" diameter glass beads were added to a mixing cup. This solution was mixed in a centrifugal mixer at 1500 rpm for 4 minutes. The cup was then sealed using parafilm and allowed to sit for twelve days. The resulting solution was a viscous paste that can be buttered onto substrates using a spatula or similar tool.

Comparative Example 1

B-Staging of Bis A PN

A 6" diameter crystallization dish was lined with aluminum foil. 50 g of Bis A PN was poured into the crystallization dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A prepolymer).

Comparative Example 1.1

Paste Formulation—Bis A PN 4.0 g of MIBK was added to a mixing cup along with three 0.2" diameter glass beads followed by 0.5 g Ketaspire KT-820 UFP, 0.01 g R972 fumed silica, and 5.5 g of the Bis A prepolymer powder (Comparative Example 1). This solution was mixed in a centrifugal mixer at 1500 rpm for 4 minutes. The cup was then sealed using parafilm and allowed to sit for 2 days. The resulting solution was a viscous paste that can be buttered onto substrates using a spatula or similar tool.

Comparative Example 2

Ultem 1000® Polyetherimide

Example 6

Post Curing

Samples were cured under nitrogen in a box furnace using the following cure schedule: 200° C. (90 minutes), 250° C. (6 hours), 300° C. (3 hours), 350° C. (3 hours), 375° C. (6 hours).

Thermooxidative Stability Testing

Thermooxidative stability measurements of post-cured resins were carried out using a thermogravimetric analyzer (TGA Q500). Samples of 10-15 mg were evaluated using a 10° C./min temperature ramp from ambient temperature to 1000° C. in air. For long term thermal stability tests, samples of 10-15 mg were evaluated using a 25° C./min temperature ramp from ambient temperature to 370 or 399° C. followed by 12 hours at 370 or 399° C. in air.

TABLE 1

Thermooxidative stability following 10° C./min temperature ramp to 1000° C. $T_{d,5\%}$ is the temperature at which 5% mass loss occurs.

| Example | Degradation temperature ($T_{d,5\%}$ ° C.) |
|---|---|
| Example 3.1 | 507 |
| Example 5.1 | 496 |
| Comparative Example1 | 509 |

TABLE 2

Long term thermal stability following a 12 hour hold at 370 or 399° C. in air.

| Example | 370° C. Isotherm Weight Remaining (%) | 399° C. Isotherm Weight Remaining (%) |
|---|---|---|
| Example 3.1 | 89 | 86 |
| Comparative Example1 | 79 | 38 |

Solubility Testing

Solvent compatibility was determined by preparing 5 wt % solids solutions in solvents such as NMP, DMSO, acetone, MEK, MIBK, ethyl acetate, isopropyl alcohol, toluene. A ✓ means the solids are fully soluble in the solvent (solution clear via a visual assessment) and an X means the solids are insoluble in the solvent (solution not clear via a visual assessment).

TABLE 3

Solubility Results

| Example | NMP | DMSO | Acetone | MEK | Ethyl Acetate | MIBK | Isopropyl Alcohol | Toluene |
|---|---|---|---|---|---|---|---|---|
| 3 | ✓ | ✓ | ✓ | ✓ | ✓ | ✓ | X | X |
| 3.1 | ✓ | ✓ | ✓ | ✓ | ✓ | ✓ | X | X |
| C1 | ✓ | ✓ | ✓ | ✓ | X | ✓ | X | X |
| C2 | ✓ | ✓ | X | X | X | X | X | X |

Lap-Shear Testing

Lap-shear panels (single-lap-joint) were prepared for Example 3.2 and Example 5.2. Samples were made with primed (Pasa Jell 107 and BR 680) titanium coupons (1"× 4"×0.063") utilizing a 1"×1" adhesive contact area. A thin layer of the paste was spread on both sides of the corresponding coupon set and a 1 mil glass scrim was added in the center of one coupon to control the bondline thickness. The corresponding panels were then aligned by hand and firmly pressed together to create a single-lap-joint panel. Each panel was appropriately balanced (including top weight) and placed in a furnace (nitrogen purged). The samples were then post cured according to Example 6. Lap-shear testing was performed with an Instron 5969 mechanical tester using a crosshead speed of 0.05 in/min and otherwise in accordance with the manufacturer's operating instructions. Three coupons of each paste were tested and the results are shown in Table 4. The results of Table 4 show that the present adhesive formulations can be cured to a strong thermoset either using a prepolymer formed only from an etherimide-phthalonitrile oligomer (Example 3.2) or a prepolymer formed from a blend of the etherimide-phthalonitrile oligomer with a bisphthalonitrile compound (Example 5.2).

TABLE 4

Lap-shear results.

| Example | Average Maximum Load (ksi) (n = 3) |
|---|---|
| Example 3.2 | 0.39 ± 0.03 |
| Example 5.2 | 0.63 ± 0.06 |
| Comparative Example 1.1 | 0.56 ± 0.07 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An adhesive formulation comprising:
an etherimide-phthalonitrile oligomer having formula

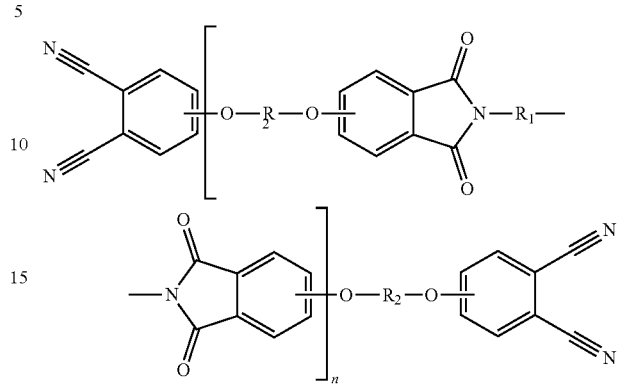

wherein $R_1$ is an unsubstituted or substituted aryl group or an unsubstituted or substituted cycloalkyl group; $R_2$ is an unsubstituted or substituted aryl group and n has a value of from 1 to 30.

2. The adhesive formulation of claim 1, wherein $R_1$ is monocyclic, or polycyclic having two or more unfused monocyclic rings.

3. The adhesive formulation of claim 1, wherein $R_1$ is unsubstituted or substituted benzene, or unsubstituted or substituted cyclohexane.

4. The adhesive formulation of claim 1, wherein $R_1$ is polycyclic having two or more unfused monocyclic rings, wherein neighboring unfused monocyclic rings are connected directly or connected via an oxygen, a sulfone, or an unsubstituted or substituted alkyl group.

5. The adhesive formulation of claim 1, wherein $R_2$ is monocyclic, or polycyclic having two or more unfused monocyclic rings.

6. The adhesive formulation of claim 1, wherein $R_2$ is unsubstituted benzene.

7. The adhesive formulation of claim 1, wherein $R_2$ is polycyclic having two or more unfused monocyclic rings, wherein neighboring unfused monocyclic rings are connected directly or connected via one or more groups selected from a group consisting of a ketone group, an ether group, a urethane group, a urea group, an amide group, an imide group, an ester group, an oxamide group, a sulfone group, an alkyl group, and an alkylene group, wherein any group may be unsubstituted or substituted.

8. The adhesive formulation of claim 1, wherein $R_2$ is polycyclic having two unfused monocyclic rings connected directly or connected via a sulfone group, an unsubstituted or substituted alkyl group, or an unsubstituted or substituted alkylene group.

9. The adhesive formulation of claim 1, wherein $R_1$ is unsubstituted or substituted benzene; or unsubstituted or substituted cyclohexane; or polycyclic having two or more unfused monocyclic rings, wherein neighboring unfused monocyclic rings are connected directly or connected via an oxygen, a sulfone, or an unsubstituted or substituted alkyl group; and
wherein $R_2$ is unsubstituted benzene; or polycyclic having two unfused monocyclic rings connected directly or connected via a sulfone group, an unsubstituted or substituted alkyl group, or an unsubstituted or substituted alkylene group.

10. The adhesive formulation of claim 1, wherein the etherimide-phthalonitrile oligomer is

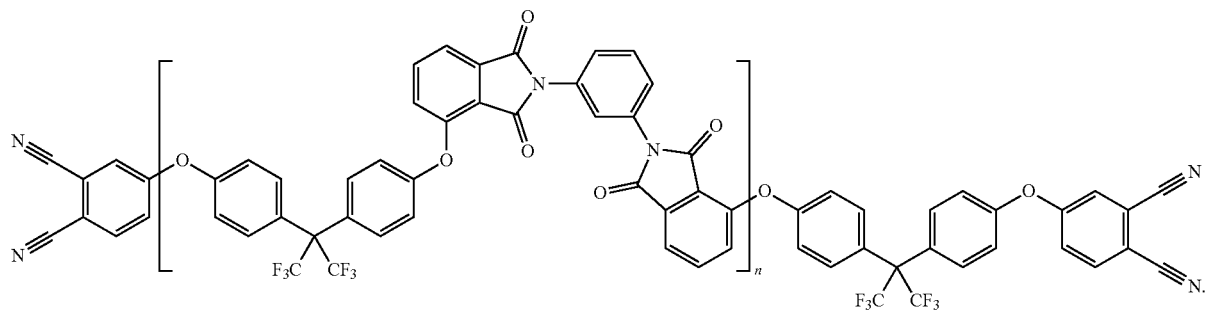

11. The adhesive formulation of claim 1, further comprising a bisphthalonitrile compound.

12. The adhesive formulation of claim 11, wherein the bisphthalonitrile compound comprises an aromatic ether linking group and an aromatic ketone linking group.

13. He adhesive formulation of claim 12, wherein the aromatic ether linking group is provided by a bisphenol and the aromatic ketone linking group is provided by a benzophenone.

14. The adhesive formulation of claim 1, wherein a portion of phthalonitrile moieties in the etherimide-phthalonitrile oligomer are crosslinked, forming a prepolymer.

15. The adhesive formulation of claim 14, further comprising a liquid medium.

16. The adhesive formulation of claim 15, further comprising a filler.

17. The adhesive formulation of claim 15, the adhesive formulation in the form of a paste having a shear viscosity of greater than 1,000 cps as measured at room temperature and 100 Hz.

18. The adhesive formulation of claim 15, the adhesive formulation in the form of a spray having a shear viscosity of less than 300 cps as measured at room temperature and 100 Hz.

19. A method of making an adhesive formulation, the method comprising:

inducing crosslinking in a portion of phthalonitrile moieties of an etherimide-phthalonitrile oligomer having formula

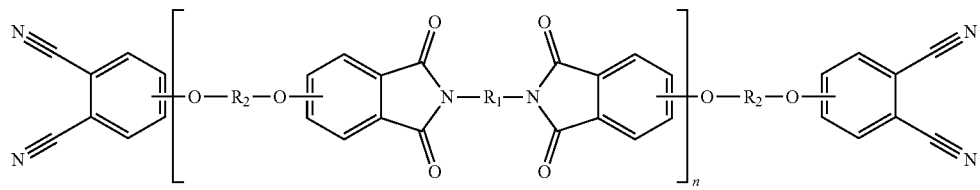

wherein $R_1$ is an unsubstituted or substituted aryl group or an unsubstituted or substituted cycloalkyl group; $R_2$ is an unsubstituted or substituted aryl group and n has a value of from 1 to 30, to form a prepolymer; and combining the prepolymer with a liquid medium to form an adhesive formulation.

20. The method of claim 19, further comprising synthesizing the etherimide-phthalonitrile oligomer by reacting a bisimide monomer, a diol, and a phthalonitrile endcapper, wherein the bisimide monomer has formula

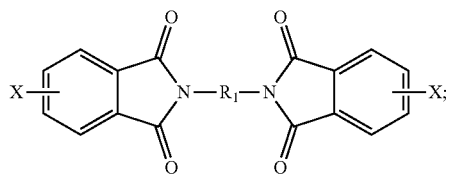

the diol has formula HO—$R_2$—OH; and
the phthalonitrile endcapper has formula

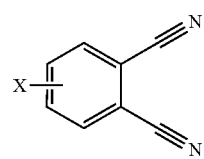

wherein X is $NO_2$, or a halogen.

21. A method of using the adhesive formulation of claim 15, the method comprising heating the adhesive formulation according to a curing profile to form a poly(etherimide-phthalonitrile) thermoset polymer.

22. A poly(etherimide-phthalonitrile) thermoset polymer formed by curing the adhesive formulation of claim 15.

23. The poly(etherimide-phthalonitrile) thermoset polymer of claim 22 having a degradation temperature of greater than 450° C., an average maximum load of from 300 psi to 6,000 psi, or both.

24. An adhesive article comprising a substrate and a layer of the adhesive formulation of claim 15 on a surface of the substrate, optionally, wherein the layer is cured to form a poly(etherimide-phthalonitrile) thermoset polymer.

25. The adhesive article of claim 24, wherein the substrate is a metal, a metal alloy, a composite thereof, or combinations thereof.

26. An etherimide-phthalonitrile oligomer having formula
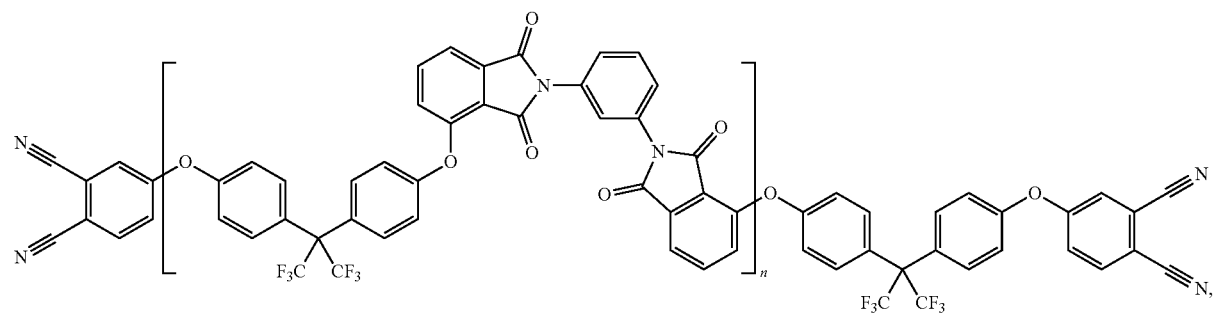
wherein n has a value of from 1 to 30.
* * * * *